(12) United States Patent
Yamamoto et al.

(10) Patent No.: US 10,720,693 B2
(45) Date of Patent: Jul. 21, 2020

(54) ELECTRONIC APPARATUS

(71) Applicant: Lenovo (Singapore) Pte. Ltd., Singapore (SG)

(72) Inventors: Osamu Yamamoto, Kanagawa (JP); Fumitake Mizoguchi, Kanagawa (JP); Masaaki Bandoh, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/396,004

(22) Filed: Apr. 26, 2019

(65) Prior Publication Data

US 2020/0194870 A1   Jun. 18, 2020

(30) Foreign Application Priority Data

Dec. 18, 2018 (JP) ................................. 2018-236544

(51) Int. Cl.
| | |
|---|---|
| *H01Q 1/22* | (2006.01) |
| *G06F 1/16* | (2006.01) |
| *H01Q 1/48* | (2006.01) |
| *H01Q 1/24* | (2006.01) |

(52) U.S. Cl.
CPC ......... *H01Q 1/2266* (2013.01); *G06F 1/1616* (2013.01); *G06F 1/1656* (2013.01); *G06F 1/1698* (2013.01); *H01Q 1/243* (2013.01); *H01Q 1/48* (2013.01); *G06F 1/1637* (2013.01); *G06F 1/1662* (2013.01); *G06F 1/1681* (2013.01); *H01Q 1/2291* (2013.01)

(58) Field of Classification Search
CPC ... G06F 1/1656; G06F 1/1698; H01Q 1/2266; H01Q 1/243
See application file for complete search history.

(56) References Cited

U.S. PATENT DOCUMENTS

| | | | | | |
|---|---|---|---|---|---|
| 4,359,707 | A | * | 11/1982 | Spannhake | H01J 29/003 335/284 |
| 4,733,245 | A | * | 3/1988 | Mussler | H01Q 19/09 343/769 |
| 5,394,160 | A | * | 2/1995 | Iwasaki | H01Q 1/243 343/702 |
| 6,509,877 | B2 | * | 1/2003 | Masaki | G06F 1/1616 343/702 |
| 6,809,690 | B2 | * | 10/2004 | Tao | G06F 1/1616 343/702 |
| 6,879,293 | B2 | * | 4/2005 | Sato | G06F 1/1616 343/702 |

(Continued)

FOREIGN PATENT DOCUMENTS

JP   2013-162413 A   8/2013

*Primary Examiner* — Adrian S Wilson
(74) *Attorney, Agent, or Firm* — Osha Liang LLP (57) ABSTRACT

An electronic apparatus includes a conductive part provided to configure an outer wall of a main body chassis and formed of a conductive material, a radio wave transmission part provided to configure the outer wall of the main body chassis and formed of a resin material, and a first antenna provided at a position facing the radio wave transmission part inside the main body chassis. The conductive part has a first protrusion portion protruded toward the inside of the main body chassis and joined to the resin material which forms the radio wave transmission part. The first protrusion portion is electrically connected to the first antenna.

6 Claims, 7 Drawing Sheets

(56) References Cited

U.S. PATENT DOCUMENTS

| | | | | |
|---|---|---|---|---|
| 8,896,487 B2* | 11/2014 | Chiang | G06F 1/1616 | 343/700 MS |
| 9,400,529 B2* | 7/2016 | Chang | H04M 1/0277 | |
| 9,972,892 B2* | 5/2018 | Noori | H01Q 1/2258 | |
| 10,088,873 B2* | 10/2018 | Mizoguchi | G06F 1/1616 | |
| 10,243,279 B2* | 3/2019 | Liu | H01Q 1/24 | |
| 10,347,965 B2* | 7/2019 | Hawaka | H01Q 1/526 | |
| 2004/0113860 A1* | 6/2004 | Walton | H01Q 1/002 | 343/872 |
| 2004/0203488 A1* | 10/2004 | Sullivan | B29C 45/0053 | 455/90.1 |
| 2006/0061512 A1* | 3/2006 | Asano | G06F 1/1616 | 343/702 |
| 2006/0244663 A1* | 11/2006 | Fleck | G06F 1/1616 | 343/700 MS |
| 2008/0039160 A1* | 2/2008 | Homer | H01Q 1/12 | 455/575.7 |
| 2008/0238788 A1* | 10/2008 | Agata | H01Q 1/243 | 343/702 |
| 2009/0179806 A1* | 7/2009 | Ji | G06F 1/1616 | 343/702 |
| 2009/0185340 A1* | 7/2009 | Ji | B29C 45/14786 | 361/679.21 |
| 2010/0073241 A1* | 3/2010 | Ayala Vazquez | H01Q 1/2266 | 343/702 |
| 2010/0238621 A1* | 9/2010 | Tracy | B29C 45/14639 | 361/679.27 |
| 2013/0207853 A1* | 8/2013 | Yamamoto | H01Q 1/002 | 343/702 |
| 2013/0285516 A1* | 10/2013 | Mizoguchi | H05K 5/02 | 312/7.2 |
| 2016/0216730 A1* | 7/2016 | Mizoguchi | G06F 1/1616 | |
| 2017/0068271 A1* | 3/2017 | Mizoguchi | G06F 1/1616 | |
| 2017/0177028 A1* | 6/2017 | Mizoguchi | B32B 25/02 | |
| 2017/0308119 A1* | 10/2017 | Mizoguchi | B32B 7/04 | |
| 2018/0004255 A1* | 1/2018 | Mizoguchi | G06F 1/1616 | |
| 2018/0375189 A1* | 12/2018 | Hawaka | H01Q 1/2266 | |

* cited by examiner

ELECTRONIC APPARATUS

TECHNICAL FIELD

The present invention relates to an electronic apparatus having antennas.

BACKGROUND

An electronic apparatus like a notebook type personal computer (laptop PC) has been equipped with antennas for various wireless communications such as a WWAN (Wireless Wide Area Network), a WLAN (Wireless Local Area Network), etc. (refer to, for example, Japanese Unexamined Patent Application Publication No. 2013-162413).

SUMMARY

In such an electronic apparatus as described above, a part formed of a resin material is normally provided at an outer wall of a chassis to ensure communication quality of an antenna accommodated thereinside. Then, such a chassis has been rapidly advanced in its miniaturization and thinning, and therefore it is difficult for the chassis to sufficiently ensure an installation space of the antenna. Thus, it has also been considered that a part formed of a metal material is provided at a part of the outer wall of the chassis and utilized as an antenna element. Since, however, a connection part of the resin material and the metal material is formed at a part of the chassis in such a configuration, it is necessary to ensure the strength of the connection part.

One or more embodiments of the present invention provide an electronic apparatus capable of ensuring the strength of a chassis even in a configuration having an antenna thereinside.

An electronic apparatus according to one or more embodiments of the present invention is an electronic apparatus having a chassis. The electronic apparatus includes a conductive part provided to configure an outer wall of the chassis and formed of a conductive material, a radio wave transmission part provided to configure the outer wall of the chassis and formed of a resin material, and an antenna provided at a position facing the radio wave transmission part inside the chassis. The conductive part has a first protrusion portion protruded toward the inside of the chassis and joined to the resin material forming the radio wave transmission part. The conductive part functions as an antenna element of the antenna by an electrical connection of the first protrusion portion to the antenna.

According to such a configuration, since the conductive part which configures the outer wall of the chassis functions as the antenna element of the antenna, it is possible to ensure high communication quality while minimizing an occupied space of the antenna inside the chassis. Further, the conductive part is joined to the resin material of the radio wave transmission part through the first protrusion portion. Consequently, since the conductive part is joined to the radio wave transmission part with a high joining strength, the strength of the chassis can be ensured.

The first protrusion portion may have a first joint portion joined to the resin material, and a first terminal portion provided on a tip side than the first joint portion in a protruding direction of the first protrusion portion and not joined to the resin material, and in the first protrusion portion, the first terminal portion may be electrically connected to the antenna. Then, the first protrusion portion is firmly joined to the resin material by the first joint portion on its root side, and the first terminal portion on the tip side is penetrated through the resin material and can hence be reliably exposed to the outside.

The conductive part may have a second protrusion portion protruded toward the inside of the chassis and joined to the resin material forming the radio wave transmission part, and the second protrusion portion may function as a ground of the conductive part relative to the chassis by being electrically connected to the chassis. Then, the first protrusion portion of the conductive part for power feeding from the antenna, and the second protrusion portion thereof for the ground can also be utilized to enhance the strength of joining to the radio wave transmission part. The strength of joining between the conductive part and the radio wave transmission part is therefore further enhanced.

The second protrusion portion may have a second joint portion joined to the resin material, and a second terminal portion provided on a tip side than the second joint portion in a protruding direction of the second protrusion portion and not joined to the resin material, and in the second protrusion portion, the second terminal portion may be electrically connected to the chassis.

The conductive part may have a third protrusion portion protruded toward the inside of the chassis and joined to the resin material forming the radio wave transmission part, and the third protrusion portion may be smaller in protrusion length than the first protrusion portion and the second protrusion portion. In doing so, unlike the first and second protrusion portions also used as connection terminals, the protrusion length of the third protrusion portion used only for enhancement of the strength of joining to the radio wave transmission part can be suppressed as much as possible. It is therefore possible to maximally ensure the distance between the third protrusion portion provided in the conductive part which functions as the antenna element, and a conductor inside the chassis and suppress deterioration in communication quality at the conductive part.

A display chassis rotatably connected to one end of the chassis and provided with a display may be provided, and the conductive part may be provided at a position including a corner of a side surface of the outer wall at the other end opposite to the one end of the chassis. In doing so, the conductive part can ensure communication quality stable at any time without depending on the rotational angle of the display chassis. Further, the conductive part is joined to the radio wave transmission part by using the first protrusion portion and the like. It is therefore possible to ensure the strength of each corner likely to be subjected to a large shock in the cases such as when the electronic apparatus is erroneously dropped.

One or more embodiments of the present invention can ensure the strength of a chassis even in a configuration having an antenna thereinside.

DETAILED DESCRIPTION

An electronic apparatus according to one or more embodiments of the present invention will hereinafter be described in detail with reference to the accompanying drawings.

Figure 1:
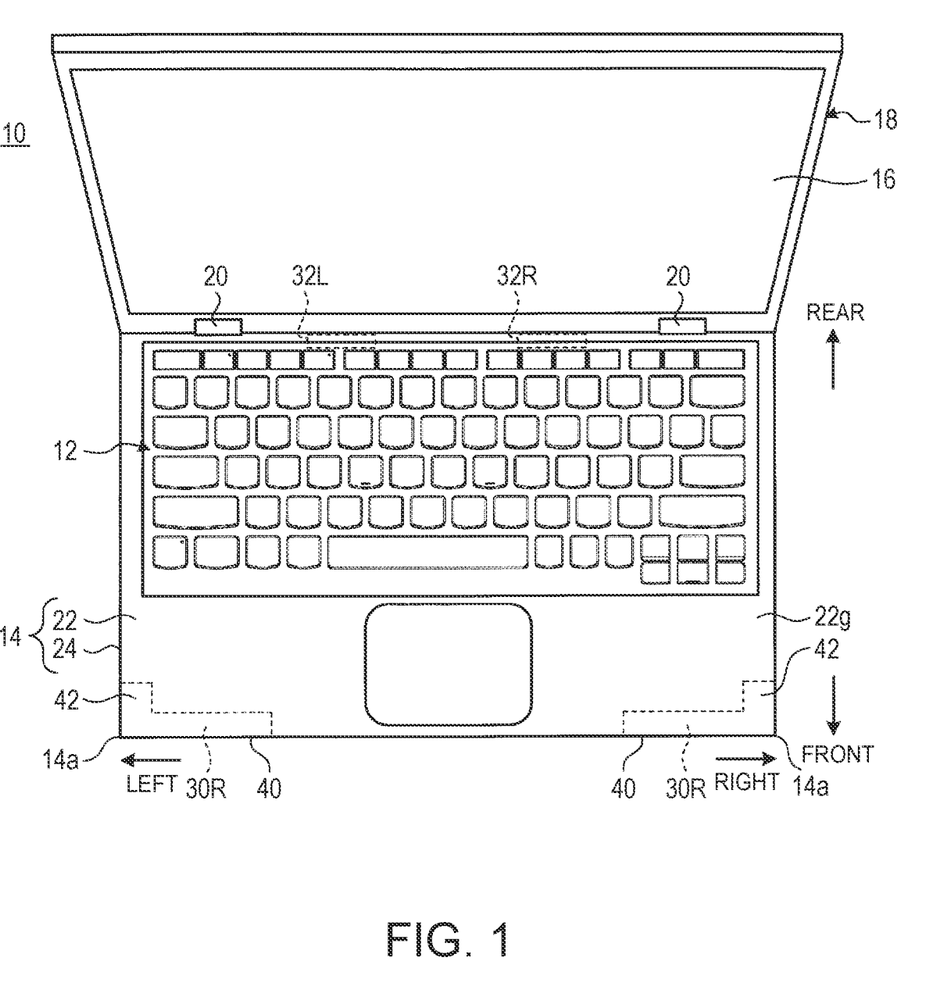
FIG. 1 is a plan view of an electronic apparatus according to one or more embodiments.

FIG. 1 is a plan view of an electronic apparatus 10 according to one or more embodiments. In one or more embodiments, a laptop PC is illustrated as the electronic apparatus 10. The electronic apparatus 10 may be a desktop PC, a tablet PC, or the like.

As illustrated in FIG. 1, the electronic apparatus 10 includes a main body chassis 14 having a keyboard device 12, and a display chassis 18 having a display device 16. The display chassis 18 is rotatably connected to a rear end of the main body chassis 14 through a pair of right and left hinges 20 and 20. The display device 16 is, for example, a liquid crystal display.

FIG. 1 is a diagram viewing down from above, the electronic apparatus 10 in a use form with the display chassis 18 being opened from the main body chassis 14 by the hinges 20. On the basis of the direction in which the display device 16 of the electronic apparatus 10 having the use form illustrated in FIG. 1 is viewed from the front, the front of the main body chassis 14, its deep side, its thickness direction, and its width direction will hereinafter be referred to as the front, the rear, the top and bottom, and the right and left respectively for the purpose of description. Further, as to the main body chassis 14 and each component to be mounted thereto, the central side than the outer peripheral side, and the outer peripheral side than the central side in a state in which the main body chassis 14 is seen in a planar manner will respectively be referred to as the inside and outside for the purpose of description. Incidentally, the directions of these are shown for convenience of description. Accordingly, for example, the above-mentioned top and bottom directions and right and left directions may be inversed depending on the arrangement of each component in a product, its installation attitude, etc.

The main body chassis 14 is a thin box-like chassis formed of a top cover 22 and a bottom cover 24. The top cover 22 is a plate-like member which forms a top surface and four peripheral side surfaces of the main body chassis 14. The bottom cover 24 is a plate-like member which forms a bottom surface of the main body chassis 14.

Figure 2:
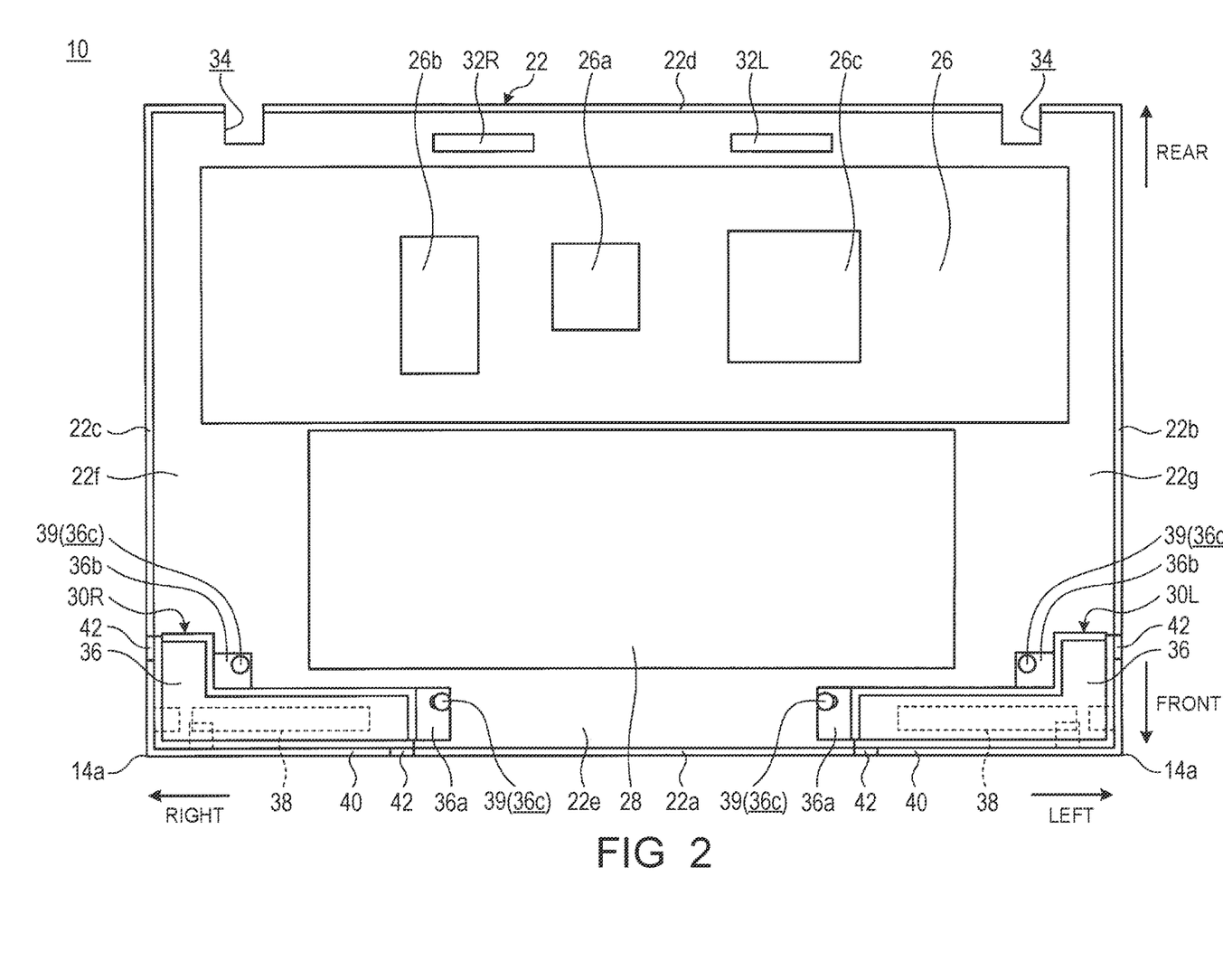
FIG. 2 is a bottom view typically illustrating an internal structure of a main body chassis.

FIG. 2 is a bottom view typically illustrating an internal structure of the main body chassis 14 and a view when viewing from the inner surface side of the top cover 22, the interior of the main body chassis 14 with the bottom cover 24 detached therefrom.

As illustrated in FIG. 2, there are accommodated inside the main body chassis 14, an electronic circuit substrate 26, a battery device 28, a pair of right and left first antennas 30L and 30R, and a pair of right and left second antennas 32L and 32R. A cooling module, a hard disk device, etc. not shown in the drawing are further accommodated inside the main body chassis 14. Reference numerals 34 in FIG. 2 are recessed portions where the hinges 20 are to be arranged.

The electronic circuit substrate 26 is a motherboard of the electronic apparatus 10. The electronic circuit substrate 26 is, for example, a PCB (Printed Circuit Board) on which various electronic parts such as a CPU 26a, a power supply circuit 26b, a memory 26c, etc. are mounted.

The first antennas 30L and 30R (hereinafter collectively also called a "first antenna 30") are antennas based on the wireless communication standards of WWAN, for example. The first antenna 30 has an antenna module 36 having an L-shape in plan view, and an antenna element 38 provided on the surface of the antenna module 36. The first left antenna 30L is disposed along the corner (front end corner 14a) between a front wall 22a of the top cover 22 and a left side wall 22b thereof. The first right antenna 30R is disposed along the corner (front end corner 14a) between the front wall 22a of the top cover 22 and a right side wall 22c thereof.

The antenna module 36 has, for example, a pair of mounting pieces 36a and 36b protrusively provided therefrom. The mounting pieces 36a and 36b are respectively formed with mounting holes 36c. The first antenna 30 is fixed to an inner surface 22e of the top cover 22 by screws 39 penetrated through the mounting holes 36c of the mounting pieces 36a and 36b.

The second antennas 32L and 32R are antennas based on the wireless communication standards of WLAN, for example. The second antennas 32L and 32R are disposed along a rear wall 22d of the top cover 22 at positions between the right and left recessed portions 34 and 34. The second antennas 32L and 32R are screwed to the inner surface 22e of the top cover 22.

Figure 3:
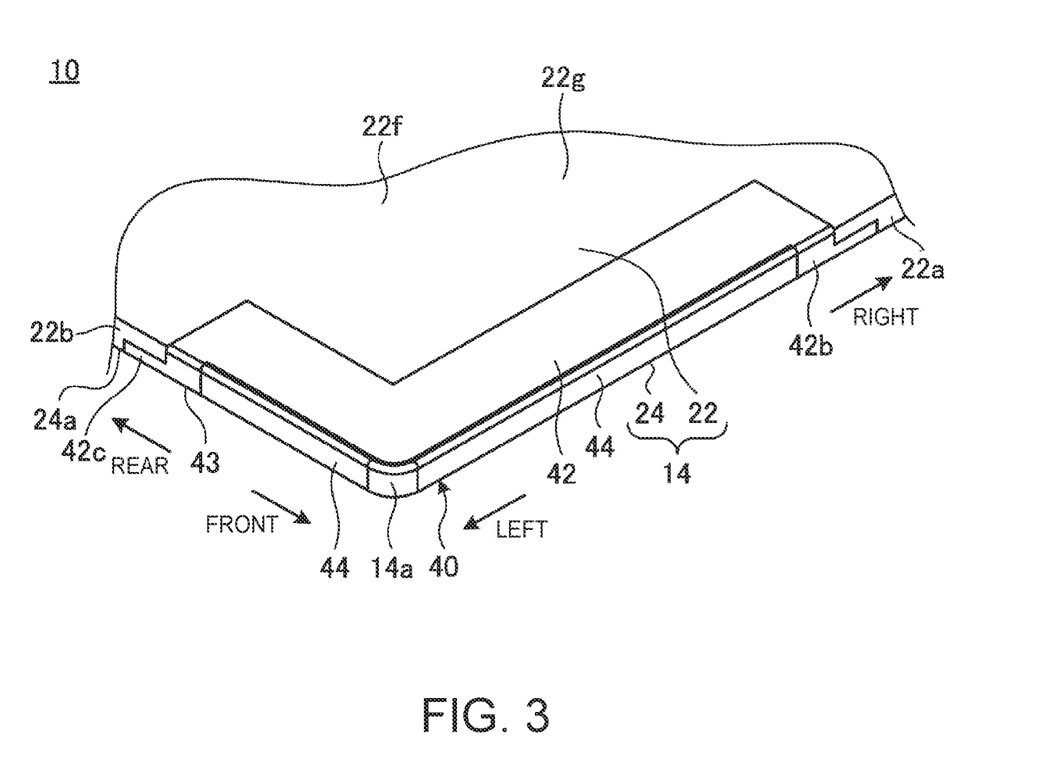
FIG. 3 is a perspective view illustrating a left front end corner of the main body chassis in an enlarged form.
Figure 4:
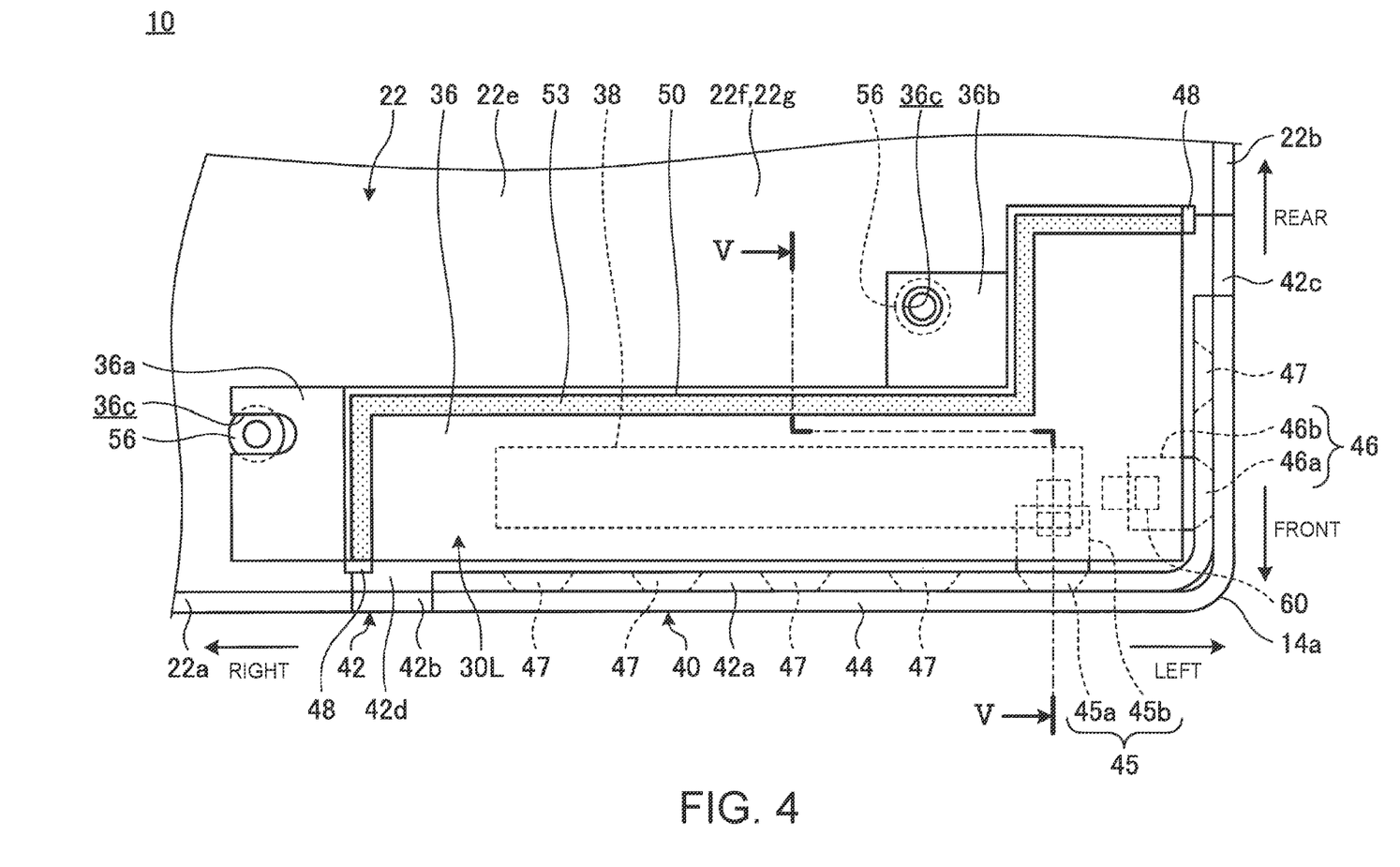
FIG. 4 is a bottom view illustrating in an enlarged form, a first antenna and its peripheral parts on the left in FIG. 2.
Figure 5:
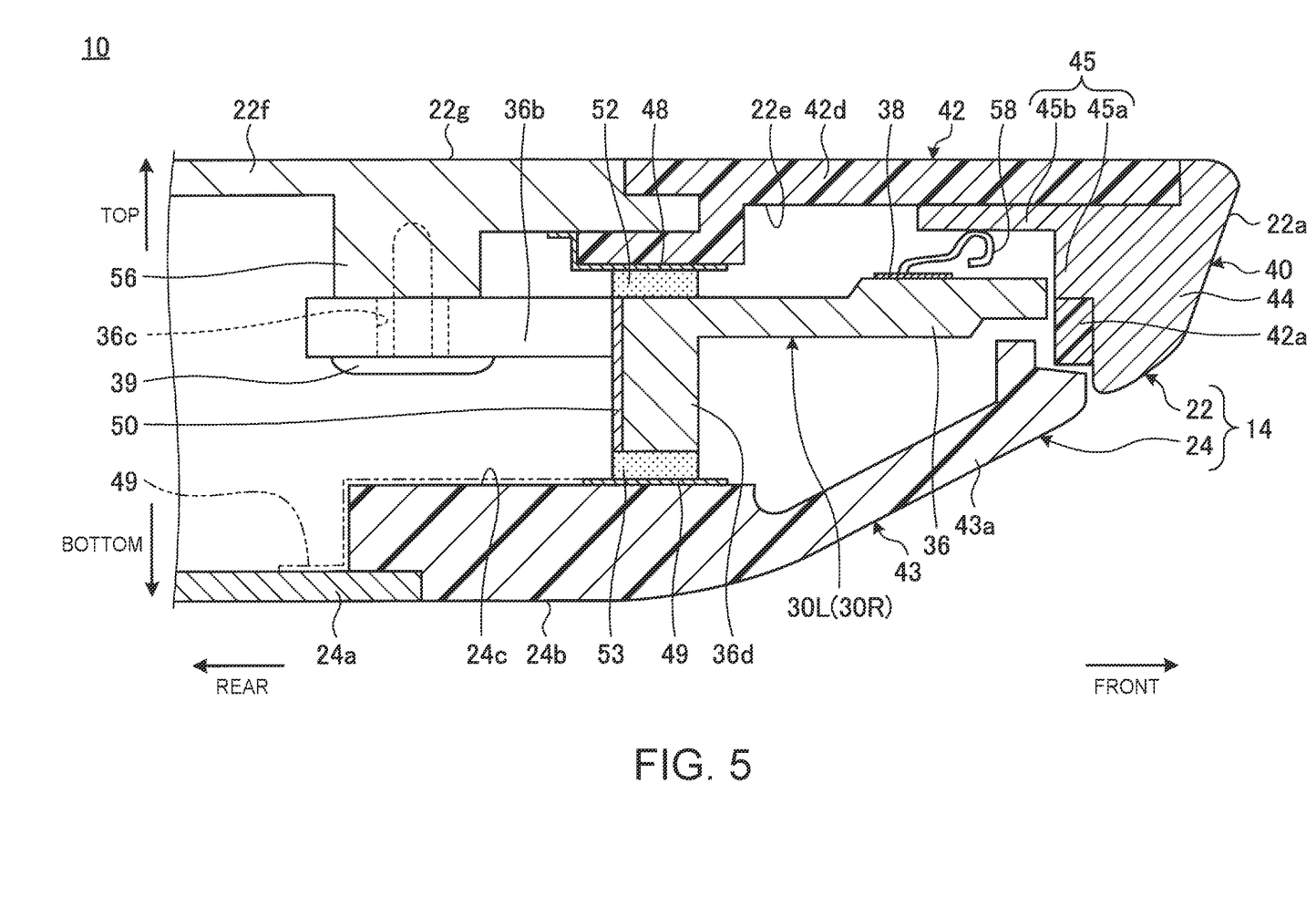
FIG. 5 is a typical sectional view taken along line V-V in FIG. 4.
Figure 6:
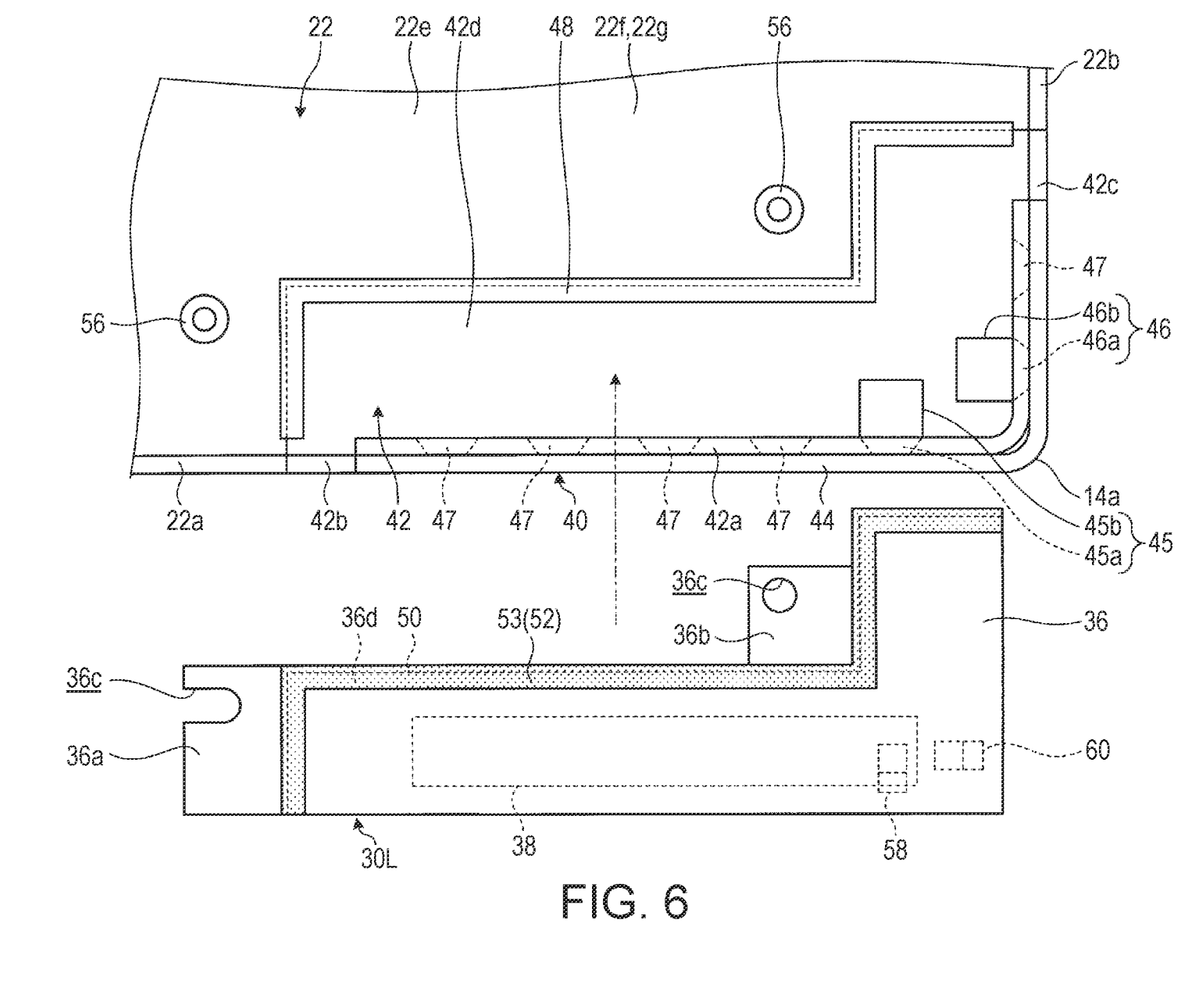
FIG. 6 is an exploded bottom view illustrating a state in which the first antenna is mounted to a top cover illustrated in FIG. 4.
Figure 7:
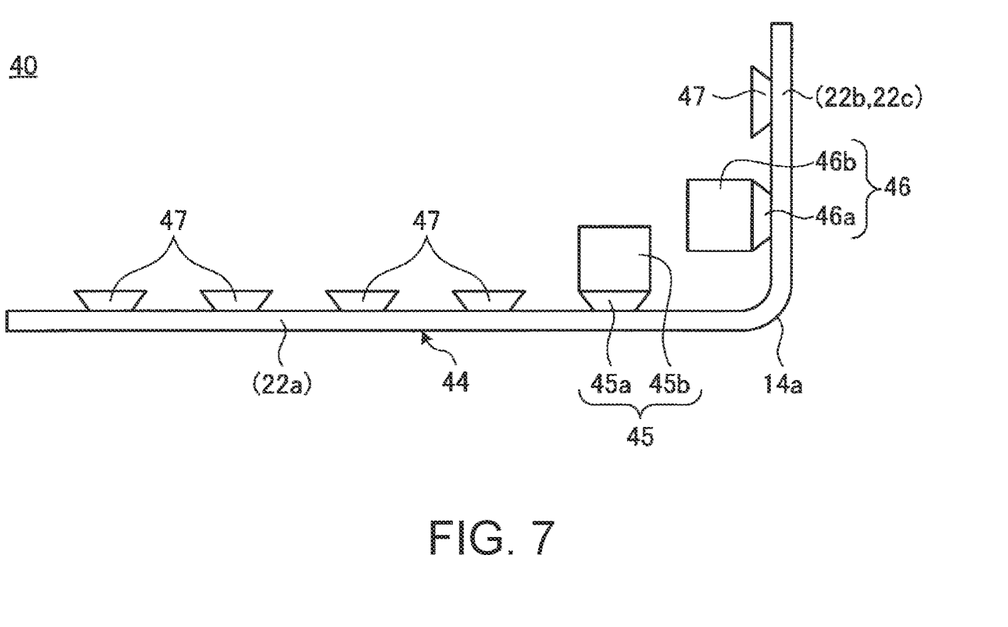
FIG. 7 is a bottom view typically illustrating a configuration of a conductive part.

Next, description will be made as to a specific configuration of the first antenna 30 and its peripheral parts. FIG. 3 is a perspective view illustrating the left front end corner of the main body chassis 14 in an enlarged form. FIG. 4 is a bottom view illustrating in an enlarged form, the first left antenna 30L and its peripheral parts in FIG. 2. FIG. 5 is a typical sectional view taken along line V-V in FIG. 4, and is illustrated assuming that a top wall 22g of the main body chassis 14 and a bottom wall 24b thereof are respectively defined as the top and bottom in matching with an actual use attitude. FIG. 6 is an exploded bottom view illustrating a state in which the first antenna 30L is mounted to the top cover 22 illustrated in FIG. 4. FIG. 7 is a bottom view typically illustrating a configuration of a conductive part 40. Incidentally, the first left antenna 30L is typically illustrated in FIGS. 3 through 7, but the first right antenna 30R is the same in configuration as the first left antenna except for being a right-left symmetrical structure.

As illustrated in FIGS. 2 through 6, the conductive part 40 and radio wave transmission parts 42 and 43 are provided at a part of an outer wall of the main body chassis 14. The conductive part 40 and the radio wave transmission parts 42 and 43 are provided at a portion where the first antenna 30 is installed, i.e., the right and left front end corners 14a of the main body chassis 14 and their peripheries. In the main body chassis 14 of one or more embodiments, a chassis member 22f and a chassis member 24a which form the most parts of the top cover 22 and the bottom cover 24 are formed of a metal plate of, for example, magnesium, aluminum or the like. The conductive part 40 and the radio wave transmission parts 42 and 43 are joined to these chassis members 22f and 24a to configure a part of the main body chassis 14.

The conductive part 40 is provided at the side surface including the front end corners 14a, of the main body chassis 14. The conductive part 40 is formed of a metal having conductivity such as magnesium, copper, aluminum or the like, for example. As illustrated in FIGS. 3 and 7, the conductive part 40 has a vertical wall portion 44 having an L-shape in plan view, a first rib 45, a second rib 46, and a plurality of third ribs 47.

The vertical wall portion 44 is a portion which forms a part of the front wall 22a of the top cover 22 and a part of the side wall 22b (22c) thereof. The vertical wall portion 44 extends from the front wall 22a to the side wall 22b (22c) with the front end corner 14a interposed therebetween.

The first rib 45 is a protrusion portion protruded from the front wall 22a of the vertical wall portion 44 to the inside (rear) of the main body chassis 14 and is provided in the vicinity of the front end corner 14a. The first rib 45 has a joint portion 45a on the root side thereof in its protruding direction from the vertical wall portion 44, and a terminal portion 45b on the tip side thereof. The joint portion 45a is a plate piece formed into a fan-shape in plan view, which is gradually expanded in a horizontal width size in the protruding direction of the first rib 45. The terminal portion 45b is a plate piece formed into a rectangle shape in plan view. The joint portion 45a is smaller than the vertical wall portion 44 in vertical thickness, whereas the terminal portion 45b is a thin plate much smaller than the joint portion 45a in thickness (refer to FIG. 5). The joint portion 45a is a portion to be joined to the radio wave transmission part 42 (refer to FIGS. 4 and 5). The terminal portion 45b is a portion electrically connected to the antenna element 38 of the first antenna 30 (refer to FIGS. 4 and 5).

The second rib 46 is a protrusion portion protruded from the side wall 22b (22c) of the vertical wall portion 44 to the inside (right and left) of the main body chassis 14 and is provided in the vicinity of the front end corner 14a. The second rib 46 has a configuration similar to that of the first rib 45 except for being different in arrangement and protruding direction. That is, the second rib 46 has a joint portion 46a similar to the joint portion 45a, and a terminal portion 46b similar to the terminal portion 45b. The joint portion 46a is a portion to be joined to the radio wave transmission part 42 (refer to FIGS. 4 and 5). The terminal portion 46b is a portion to be electrically connected to the chassis member 22f (refer to FIG. 4).

There are provided plural, e.g., five third ribs 47 each of which is a protrusion portion which protrudes from the front wall 22a and the side wall 22b (22c) of the vertical wall portion 44 to the inside (rear, right and left) of the main body chassis 14. The third rib 47 has a shape in which the terminal portions 45b and 46b are eliminated from the first rib 45 and the second rib 46 respectively. That is, each third rib 47 is a plate piece formed into a fan-shape in plan view, which is gradually expanded in a horizontal width size in its protruding direction. The third rib 47 is smaller in protrusion length than the first rib 45 and the second rib 46 and is the same in protrusion length as the joint portions 45a and 46a. The third rib 47 is joined to the radio wave transmission part 42 (refer to FIG. 4).

The radio wave transmission parts 42 and 43 are respectively formed into a substantially L-shape in plan view and connect between the conductive part 40 and the chassis members 22f and 24a so as to surround the periphery of the conductive part 40. The radio wave transmission parts 42 and 43 are formed of a resin material having radio wave transmissivity such as polyphenylene sulfide (PPS) or the like. The radio wave transmission parts 42 and 43 are parts to transmit radio waves transmitted and received by the first antenna 30. The radio wave transmission part 42 is joined to the chassis member 22f and the conductive part 40 by insert molding, for example. The radio wave transmission part 43 is joined to the chassis member 24a by insert molding, for example. In one or more embodiments, there is used a method so-called NMT (Nano Molding Technology) of upon insert molding of the conductive part 40 and the radio wave transmission parts 42 and 43, subjecting the surface of the conductive part 40 to surface processing in advance to form fine concave/convex shapes, thereby further enhancing a joining strength between the two. Incidentally, although the boundary portions between the radio wave transmission parts 42 and 43 and the chassis members 22f and 24a are manifested in FIG. 3, the joints of the boundary portions are not shown in external appearance because the surface of the main body chassis 14 is applied with coating in an actual product.

As illustrated in FIGS. 3 and 6, the radio wave transmission part 42 on the top cover 22 side has a vertical wall portion 42a having an L-shape in plan view, a pair of external wall portions 42b and 42c, and a top wall portion 42d. The radio wave transmission part 43 on the bottom cover 24 side has a bottom wall portion 43a.

The vertical wall portion 42a is a portion provided along the inside of the vertical wall portion 44 of the conductive part 40. The vertical wall portion 42a is joined to each of the ribs 45 through 47 of the conductive part 40 in a state of being fitted thereto and is joined to the conductive part 40 with a high strength. The thickness of the vertical wall portion 42a is approximately the same as the protrusion lengths of the joint portions 45a and 46a of the ribs 45 and 46 and the third ribs 47. Therefore, the terminal portions 45b and 46b of the ribs 45 and 46 are penetrated through the vertical wall portion 42a and exposed on the inner surface 22e (refer to FIGS. 5 and 6). That is, the ribs 45 and 46 are firmly joined to a resin material by the joint portions 45a and 46a on their root sides, and the terminal portions 45b and 46b on their tip sides can be penetrated through the resin material to be reliably exposed to the outside.

Each of the external wall portions 42b and 42c is a portion which forms a part of the side wall 22b (22c) of the top cover 22. The external wall portion 42b connects between the front wall 22a of the chassis member 22f and the vertical wall portion 42a of the conductive part 40. The external wall portion 42c connects between the side wall 22b (22c) of the chassis member 22f and the vertical wall portion 42a of the conductive part 40.

The top wall portion 42d is a portion which forms a part of the top wall 22g of the top cover 22. The top wall portion 42d is provided to be interposed between the conductive part 40 and the chassis member 22f. The top wall portion 42d forms the vicinity of the front end corner 14a at the front edge of the chassis member 22f and the vicinity of the front end corner 14a at each of the right and left side edges of the chassis member 22f.

The bottom wall portion 43a is a portion which forms a part of the bottom wall 24b of the bottom cover 24. The bottom wall portion 43a forms the vicinity of the front end corner 14a at the front edge of the chassis member 24a and the vicinity of the front end corner 14a at each of the right and left side edges of the chassis member 24a.

As illustrated in FIGS. 5 and 6, a shield contact plate 48 is provided on the inner surface 22e of the top cover 22 in the vicinity of the boundary between the radio wave transmission part 42 and the chassis member 22f. The shield contact plate 48 has at least part electrically connected to the chassis member 22f. As illustrated in FIG. 5, a shield contact plate 49 is provided even on an inner surface 24c of the bottom cover 24 in the vicinity of the boundary between the radio wave transmission part 43 and the chassis member 22f. The shield contact plate 49 has at least part electrically connected to the chassis member 24a (refer to the shield contact plate 49 indicated by a two-dot chain line in FIG. 5).

As illustrated in FIGS. 4 through 6, the first antenna 30 is provided at a position inwardly of the conductive part 40 and facing to the radio wave transmission parts 42 and 43. The first antenna 30 has an antenna module 36 and an antenna element 38.

The antenna module 36 is formed into an L-shape in plan view and formed of, for example, a printed circuit board and a bracket which supports the printed circuit board. The antenna module 36 is connected to an electronic circuit board 26 through an unillustrated wire. The antenna module 36 has a vertical wall portion 36d at the edge thereof disposed inside the main body chassis 14 (refer to FIG. 5). The vertical wall portion 36d is provided with a shield wall 50 at the side surface thereof facing to the inside of the main body chassis 14 and provided with shield members 52 and 53 at the top and bottom surfaces thereof respectively.

The shield wall 50 is formed of a material capable of shielding electromagnetic wave noise, e.g., a metal plate having conductivity. The shield wall 50 extends over substantially the whole surface of the side surface of the antenna module 36, which faces the inside of the main body chassis 14.

The shield members 52 and 53 are respectively formed of a material capable of shielding electromagnetic wave noise and having flexibility, e.g., a conductive spongy member. The conductive spongy member includes, for example, a sponge formed of a material in which tin-plating is applied to copper, a sponge in which a resin such as polyethylene or the like is kneaded with carbon, etc. The shield members 52 and 53 are respectively formed into a strip narrow in width. The shield member 52 is stuck so as to extend along the top surface of the vertical wall portion 36d and is in contact with the shield contact plate 48. The shield member 53 is stuck so as to extend along the bottom surface of the vertical wall portion 36d and is in contact with the shield contact plate 49. Since the shield members 52 and 53 are configured to have flexibility, they can reliably be adhered closely to the shield contact plates 48 and 49 respectively.

Accordingly, the first antenna 30 is installed inside the main body chassis 14 in a state in which the antenna element 38 and the conductive part 40 are electromagnetic-wave shielded by the shield wall 50 and the shield members 52 and 53 against an electromagnetic wave generation source such as the CPU 26a or the like.

The antenna module 36 is arranged so that the mounting pieces 36a and 36b respectively overlap with boss portions 56 protruded from the inner surface 22e of the top cover 22. The screws 39 are screwed into female screws of the boss portions 56 through mounting holes 36c of the mounting pieces 36a and 36b. Thus, the first antenna 30 is fixed to the inner surface 22e of the top cover 22. The screws 39 also function as a ground of the first antenna 30.

The antenna element 38 is a part which is electrically connected to the antenna module 36 and transmits and receives radio waves, and is an antenna pattern formed on the surface of the antenna module 36 by plating or printing. Although FIG. 5 exemplifies a configuration in which the antenna element 38 is provided only on the top surface of the antenna module 36, the antenna element 38 may be provided on both the top and bottom surfaces of the antenna module 36 or only on the bottom surface thereof. A spring terminal 58 provided so as to protrude from the top surface of the antenna module 36 is connected to the antenna element 38. The spring terminal 58 is a hooked plate spring whose tip is curved. When the first antenna 30 is installed in the main body chassis 14, the spring terminal 58 comes into contact with the terminal portion 45b of the first rib 45 of the conductive part 40 in a state of being elastically energized against the terminal portion 45b (refer to FIGS. 4 and 5). That is, the terminal portion 45b functions as a power feeding terminal of the conductive part 40. Thus, the conductive part 40 is electrically connected to the antenna element 38 through the spring terminal 58 and functions as a part of the antenna element of the first antenna 30.

As illustrated in FIG. 4, the first antenna 30 is provided with a spring terminal 60 having a structure similar to that of the spring terminal 58 even on the top surface of the antenna module 36. The spring terminal 60 comes into contact with the terminal portion 46b of the second rib 46 of the conductive part 40 in a state of being elastically energized against the terminal portion 46b. The spring terminal 60 is electrically connected to the chassis member 22f through the mounting pieces 36a and 36b of the antenna module 36 and the screws 39. That is, the terminal portion 46b functions as a ground terminal of the conductive part 40.

In the first antenna 30, the antenna element 38 is capable of performing transmission/reception of radio waves from above the main body chassis 14 through the top wall portion 42d of the radio wave transmission part 42. Also, the antenna element 38 is capable of performing transmission/reception of radio waves even from below the main body chassis 14 through the bottom wall portion 43a of the radio wave transmission part 43. Further, the first antenna 30 is electrically connected to the conductive part 40 through the spring terminal 58 to enable the part of the main body chassis 14, i.e., the conductive part 40 to function as the antenna element, whereby high communication quality is obtained.

As described above, in the electronic apparatus 10, the conductive part 40 configuring the outer wall of the main body chassis 14 has the first rib 45 as the protrusion portion which protrudes toward the inside of the main body chassis 14 and is jointed to the resin material which forms the radio wave transmission part 42. Further, the first rib 45 is electrically connected to the first antenna 30, and hence the conductive part 40 functions as the antenna element of the first antenna 30.

Thus, in the electronic apparatus 10, since the conductive part 40 configuring the outer wall of the main body chassis 14 functions as the antenna element of the first antenna 30, it is possible to ensure high communication quality while minimizing an occupied space of the first antenna 30 inside the main body chassis 14. Further, the conductive part 40 is joined to the resin material of the radio wave transmission part 42 through at least the first rib 45. Thus, the strength of the main body chassis 14 can be ensured because the conductive part 40 is joined to the radio wave transmission part 42 with a high joining strength.

The conductive part 40 of the electronic apparatus 10 further has the second rib 46 as the protrusion portion, which is joined to the resin material forming the radio wave transmission part 42. Then, the second rib 46 is electrically connected to the main body chassis 14 (chassis member 22f), and hence functions as the ground terminal of the conductive part 40 relative to the main body chassis 14. That is, the electronic apparatus 10 also utilizes the second rib 46 for the ground together with the first rib 45 of the conductive part 40 for power feeding from the first antenna 30 in order to enhance the strength of joining to the radio wave transmission part 42. Thus, the joining strength between the conductive part 40 and the radio wave transmission part 42 is further enhanced.

On the other hand, unlike the first rib 45 and the second rib 46 also used as the connection terminals, the protrusion length of the third rib 47 used only for enhancement of the strength of joining to the radio wave transmission part 42 is formed to be shorter than that of the other ribs 45 and 46. It is therefore possible to maximally secure the distances between the third ribs 47 provided in the conductive part 40 functioning as the antenna element and various conductors inside the main body chassis 14, and to suppress deterioration in communication quality in the conductive part 40. Further, in the electronic apparatus 10, the first rib 45 and the second rib 46 which respectively serve as the power feeding terminal and the ground terminal are also used as for joining to the radio wave transmission part 42. It is therefore possible to reduce the installed number of third ribs 47 for securing the joining strength between the conductive part 40 and the radio wave transmission part 42.

The conductive part 40 of the electronic apparatus 10 is provided at the front end corner 14a of the main body chassis 14. It is therefore possible to ensure communication quality stable at any time without depending on the rotational angle of the display chassis 18. Further, the conductive part 40 is joined to the radio wave transmission part 42 by using the ribs 45 through 47 described above. It is therefore possible to ensure the strength of each front end corner 14a likely to be subjected to a large shock in the cases such as when the electronic apparatus 10 is accidentally fallen.

Incidentally, the present invention is not limited to the above embodiments. It is needless to say that the present invention may be freely changed within the scope not departing from the spirit of the present invention.

Although the above embodiments have exemplified the configuration in which the conductive part 40 and the radio wave transmission parts 42 and 43 are provided in the vicinity of the first antenna 30, and the conductive part 40 is used as the antenna element, there may be adopted a configuration in which each of the second antennas 32L and 32R is also similarly provided with a conductive part and radio wave transmission parts, and the conductive part is utilized as an antenna element. Further, although the above embodiments have exemplified the configuration in which the antennas 30L, 30R, 32L, and 32R are mounted to the main body chassis 14, all or part of these may be mounted to the display chassis 18.

Although the above embodiments have exemplified the configuration in which the most parts of the respective covers 22 and 24 are formed of the metal chassis members 22f and 24a respectively, the chassis members 22f and 24a may for example be formed of the same resin material as the radio wave transmission parts 42 and 43 and formed completely integrally with these chassis members 22f and 24a. In this case, since some of the chassis members 22f and 24a function as the radio wave transmission parts 42 and 43 respectively, the conductive part 40 may be joined to the chassis members 22f and 24a through the respective ribs 45 through 47.

Although the above embodiments have exemplified the first antenna 30 having the L-shape in plan view, the shape of the first antenna 30 may be other shapes, e.g., a rectangular shape in plan view or the like.

DESCRIPTION OF SYMBOLS

10 electronic apparatus
14 main body chassis
14a front end corner
18 display chassis
22 top cover
22a front wall
22b, 22c side wall
22f, 24a chassis member
24 bottom cover
30L, 30R first antenna
36 antenna module
38 antenna element
40 conductive part
42, 43 radio wave transmission part
45 first rib
45a, 46a joint portion
45b, 46b terminal portion
46 second rib
47 third rib
48, 49 shield contact plate
50 shield wall
52, 53 shield member.

The invention claimed is:

1. An electronic apparatus comprising:
   a chassis;
   a conductive part that configures an outer wall of the chassis and is formed of a conductive material;
   a radio wave transmission part that configures the outer wall of the chassis and is formed of a resin material; and
   an antenna disposed at a position facing the radio wave transmission part inside the chassis,
   wherein the conductive part comprises a first protrusion portion protruded toward the inside of the chassis and joined to the resin material forming the radio wave transmission part, and
   wherein the conductive part is an antenna element of the antenna by an electrical connection of the first protrusion portion to the antenna.

2. The electronic apparatus according to claim 1, wherein the first protrusion portion comprises:
   a first joint portion joined to the resin material; and
   a first terminal portion disposed on a tip side than the first joint portion in a protruding direction of the first protrusion portion and not joined to the resin material, and
   wherein in the first protrusion portion, the first terminal portion is electrically connected to the antenna.

3. The electronic apparatus according to claim 1, wherein the conductive part comprises a second protrusion portion protruded toward the inside of the chassis and joined to the resin material forming the radio wave transmission part, and
   wherein the second protrusion portion is a ground of the conductive part relative to the chassis by being electrically connected to the chassis.

4. The electronic apparatus according to claim 3, wherein the second protrusion portion comprises:
   a second joint portion joined to the resin material; and
   a second terminal portion disposed on a tip side than the second joint portion in a protruding direction of the second protrusion portion and not joined to the resin material, and
   wherein in the second protrusion portion, the second terminal portion is electrically connected to the chassis.

5. The electronic apparatus according to claim 3, wherein the conductive part comprises a third protrusion portion protruded toward the inside of the chassis and joined to the resin material forming the radio wave transmission part, and
   wherein the third protrusion portion is smaller in protrusion length than the first protrusion portion and the second protrusion portion.

6. The electronic apparatus according to claim 1, comprising:

a display chassis rotatably connected to one end of the chassis and provided with a display,
wherein the conductive part is disposed at a position including a corner of a side surface of the outer wall at the other end opposite to the one end of the chassis.

\* \* \* \* \*